Figure 1:
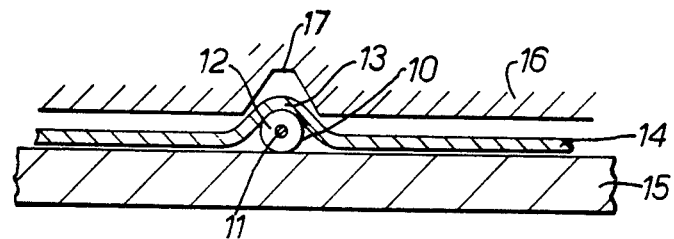

United States Patent [19]

Stewart

[11] 4,211,470
[45] Jul. 8, 1980

[54] OPTICAL FIBRE CONNECTOR

[75] Inventor: William J. Stewart, Fritwell, England

[73] Assignee: Plessey Handel und Investments AG, Zug, Switzerland

[21] Appl. No.: 950,445

[22] Filed: Oct. 11, 1978

[51] Int. Cl.² .................................................. G02B 5/14
[52] U.S. Cl. .................................................... 350/96.21
[58] Field of Search .............. 350/96, 20, 96.21, 96.22

[56] References Cited

U.S. PATENT DOCUMENTS

| 3,860,405 | 1/1975 | Coucoulas et al. | 350/96.21 |
| 4,147,404 | 4/1979 | Hensel | 350/96.21 |

FOREIGN PATENT DOCUMENTS 2408623  9/1975  Fed. Rep. of Germany ........ 350/96.21

OTHER PUBLICATIONS

P. Hensel, "A New Fibre Jointing Technique Suitable for Automation", *3rd Euro. Conf. on Optical Communication Proceedings*, Munich, W. Germany, Sep. 1977, pp. 103-105.

*Primary Examiner*—Stewart J. Levy
*Attorney, Agent, or Firm*—Fleit & Jacobson

[57] ABSTRACT

A connector for optical fibres uses the thickness of a piece of metallic foil to space an optical fibre from a known plane and utilizes the metallic foil to hold the optical fibre. Two portions are provided, each with an optical fibre retained by metallic foil, and a third member is used to align the optical fibres in one plane by abuttment against the metallic foil and in a further plane by use of, for example, a groove. Since grooves may be accurately machined and metallic foil thickness may be accurately controlled, an accurate and cheap connector may be produced.

10 Claims, 6 Drawing Figures

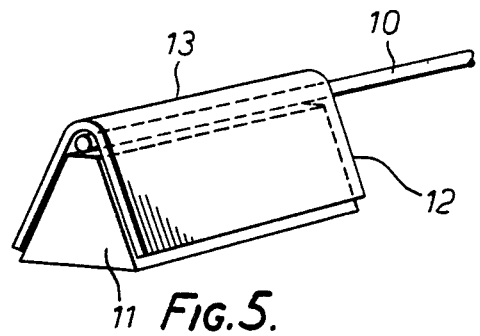
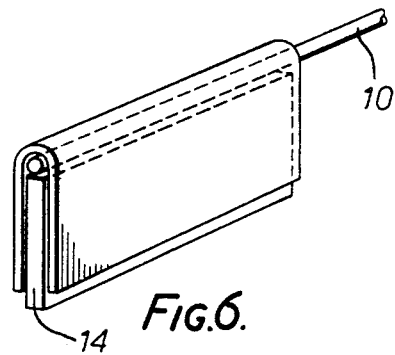

OPTICAL FIBRE CONNECTOR

The present invention relates to optical fibre connectors and, more particularly, to connectors which, whilst providing accurate alignment of the fibres, are relatively inexpensive to manufacture.

The optical fibre connector of the present invention utilises the extremely close thickness tolerance of metal foil to provide a distance spacing for optical fibres from a known plane and to enable connector parts to be cheaply constructed.

The present invention provides an optical fibre connector having first and second parts, each part including a base portion formed with a surface for retention of an optical fibre along its longitudinal axis, including a layer of metallic foil fitted to said base portion to entrap said optical fibre between the foil and the base portion, and including means for aligning said first and second parts to connect together two optical fibres.

According to a first preferred embodiment, the present invention also provides a connector for connecting together optical fibres including first and second members, each comprising a base plate or base block and said metallic foil, and in which in said connector the first and second members co-operate to accurately align the optical fibres by alignment of the outer surfaces of the metallic foil.

According to a second preferred embodiment, the present invention also provides an optical fibre connector comprising a first and a second part, each including a metallic foil formed with a first groove for insertion of an optical fibre therein, a base-plate member which, when the connector is assembled, closes said groove and thereby retains an optical fibre therein; a third part including a plate member formed with a second groove of substantially similar dimensions to the first groove and in which, when said connector is assembled, the first grooves in the first and second parts are accurately aligned by means of the second groove.

Figure 2:
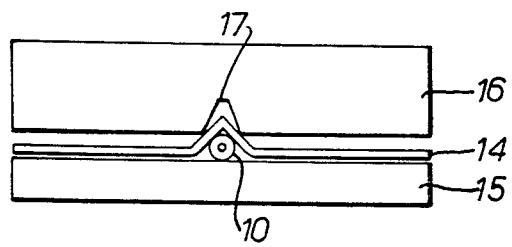
Figure 3:
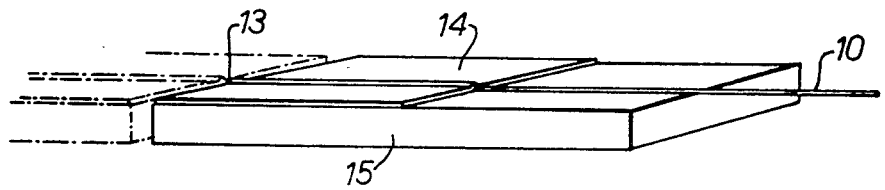
Figure 4:
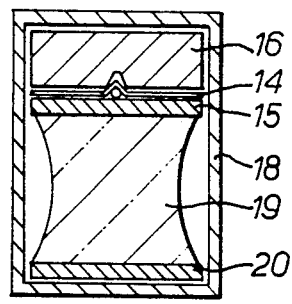

Embodiments of the present invention will now be described, by way of example with reference to the accompanying drawings in which FIG. 1 shows a portion of a first or second part of the connector assembly illustrating the principal of the invention, FIG. 2 shows in end elevation a first part of the connector assembly in co-operation with a third part, FIG. 3 shows in perspective a first or second part of the connector assembly, FIG. 4 shows a cross section of an assembled connector, FIG. 5 shows a first or second part of a second embodiment of a connector using a block as a support from a fibre, and FIG. 6 shows a first or a second part of a third embodiment of a connector using a plate as a support for the optical fibre.

Referring now to FIG. 1, there is shown an optical fibre 10 comprising a core 11 with an outer coating 12. The fibre is located in a groove 13 formed in a metal foil 14 by, for example, pressing the metal foil between suitable tools. The metal foil 14 is secured to a base plate member 15 by, for example, an epoxy resin. The base plate may be metallic, or plastic, and could be a further piece of metal foil, preferably slightly thicker than the foil 14.

The assembly of fibre 10, foil 14 and base plate member 15 is presented as shown to a plate member 16, the thickness of which will in general be greater than either foil 14 or base plate member 15. The length of the member 16 is such that two assemblies can be presented to the member 16 so that their respective grooves 13 co-operate with a groove 17 in member 16. If the ends of the assemblies are ground or are initially accurately dimensioned, the assemblies may be pushed together so that the fibre ends are accurately aligned.

The advantage of this construction is that the crucial dimension is the thickness of the foil which can be fairly accurately controlled.

FIG. 2 draws more clearly the intended principle of operation of the connector showing the compact construction and the alignment of assembly 14, 15, 10 with member 16.

Referring now to FIG. 3 a single assembly is shown illustrating the connection of a fibre to such an assembly. This assembly will as shown be the right hand assembly of a complete connector and will co-operate with a left hand assembly indicated in dotted outline.

Referring now to FIG. 4 a practical connector is shown which incorporates the assembly 14, 15, 10 and the member 16. The member 16 may be insertable in or may be formed as part of an outer casing member 18. The assembly of 14, 15, 10 is mounted on a rubber member 19 with a base member 20 which may be metallic or of hard plastics material. The insertion of the total assembly 14, 15, 10, 19 and 20 within the casing member 18 is accomplished by squeezing the rubber member 19, thus compressing the height and allowing insertion. After insertion the rubber member 19 ensures that the respective grooves 13, 17 are accurately aligned and are in contact with each other. By choice of the resilience of the rubber, the ability of the connector to withstand vibration may be altered.

To positively lock the individual assemblies longitudinally within the casing member 18 so that the fibre ends are close together, any suitable locking means may be used. For example, in a simple form of connector, a pip on the floor of the casing member may co-operate with the depression on the underside of base plate 20.

Referring now to FIG. 5 of the drawings, an optical fibre 10 is placed on top of a base block 11. A piece of metallic foil 12 is wrapped over the optical fibre 10 and effectively aligns the fibre 10 with the upper edges of the base block 11. The thickness of the metallic foil 12 may be easily controlled to a high accuracy, and therefore, by constructing two such members as shown in FIG. 1 and using the uppermost surface 13 of the foil, two fibres may be accurately aligned.

FIG. 6 shows a modified version of the member shown in FIG. 5. Instead of a block, a plate 14 is used, and the fibre 10 is held in relation to the end surface of the plate by the foil 12.

The foil 12 may be affixed to the block 11 (FIG. 5) or plate 12 (FIG. 6) by any suitable means, e.g. 12, by glueing or by crimping the ends of the foil around the base of the block 11 or plate 12.

The invention thus provides a simple means of inserting a fibre into a connector and accurate alignment of optical fibres by using the accurate gauge of a metallic foil.

What is claimed is:

1. An optical fibre connector comprising two base portions, two layers of metallic foil, each respective layer of metallic foil being secured to a respective one of said base portions to entrap a respective optical fibre between said respective layer of metallic foil and said respective one of said base portions, a plate member having a groove formed longitudinally in a surface thereof, said two base portions being adapted to engage said surface of said plate member and to abut each other, each said respective layer of metallic foil being arranged between its respective base portion and said plate member and being deformed around its respective optical fibre within said groove so that said fibres are axially aligned with said groove, and means for releasably holding said two base portions and said plate member together.

2. An optical fibre connector as claimed in claim 1, wherein each said respective layer of metallic foil is provided with a groove for the reception of said optical fibre before said respective layer of metallic foil is secured to said respective one of said base portions.

3. An optical fibre connector as claimed in claims 1 or 2, wherein each said respective one of said base portions comprises plastic.

4. An optical fibre connector as claimed in claims 1 or 2, wherein each said respective one of said base portions comprises a further layer of metallic foil thicker than said respective layer of metallic foil.

5. An optical fibre connector as claimed in claim 1, wherein said means for releasably holding said two base portions and said plate member together comprises an outer casing member, said outer casing member having resilient means for urging said base portions and said plate member together.

6. An optical fibre connector as claimed in claim 5, wherein said resilient means comprises a rubber member.

7. An optical fibre connector as claimed in claims 5 or 6, including retaining means for retaining said two base portions in abutment, said retaining means comprising projections formed on the inside of said casing, said projections being adapted to engage depressions formed in said base portions.

8. An optical fibre connector as claimed in claims 1, 2, 5 or 6, wherein each said respective one of said base portions has a rectangular cross-sectional shape.

9. An optical fibre connector as claimed in claims 1, 2, 5 or 6, wherein each said respective one of said base portions is substantially triangular in shape.

10. An optical fibre connector as claimed in any of claims 1, 2, 5 or 6, wherein each said respective one of said base portions is in the form of a thin plate, said optical fibre being secured along the edge of said thin plate.

* * * * *